(12) United States Patent
Friedel et al.

(10) Patent No.: US 11,453,923 B2
(45) Date of Patent: Sep. 27, 2022

(54) METHOD FOR MANUFACTURING FLAT STEEL PRODUCTS AND FLAT STEEL PRODUCT

(71) Applicants: ThyssenKrupp Steel Europe AG, Duisburg (DE); thyssenkrupp AG, Essen (DE)

(72) Inventors: Frank Friedel, Dortmund (DE); Friedhelm Macherey, Alpen (DE); Lena Sattler, Krefeld (DE); Robert Yanik, Moers (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 738 days.

(21) Appl. No.: 16/334,503

(22) PCT Filed: Sep. 13, 2017

(86) PCT No.: PCT/EP2017/073027
§ 371 (c)(1),
(2) Date: Mar. 19, 2019

(87) PCT Pub. No.: WO2018/054742
PCT Pub. Date: Mar. 29, 2018

(65) Prior Publication Data
US 2020/0332379 A1    Oct. 22, 2020

(30) Foreign Application Priority Data

Sep. 20, 2016   (WO) ................ PCT/EP2016/072281

(51) Int. Cl.
| | |
|---|---|
| *B32B 15/01* | (2006.01) |
| *C21D 8/02* | (2006.01) |
| *C21D 6/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C23C 2/06* | (2006.01) |
| *C23C 2/40* | (2006.01) |

(52) U.S. Cl.
CPC .......... *C21D 8/0273* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0257* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/40* (2013.01); *C21D 2211/005* (2013.01)

(58) Field of Classification Search
None
See application file for complete search history.

(56) References Cited

U.S. PATENT DOCUMENTS

| | | | |
|---|---|---|---|
| 6,162,308 | A | 12/2000 | Heckelmann et al. |
| 10,683,560 | B2 * | 6/2020 | Blumenau ............ C22C 38/004 |
| 2002/0005234 | A1 | 1/2002 | Vandeputte et al. |
| 2014/0034195 | A1 | 2/2014 | Suto et al. |
| 2017/0306430 | A1 | 10/2017 | Blumenau et al. |
| 2018/0257121 | A1* | 9/2018 | Jeon ........................ C23C 2/06 |

FOREIGN PATENT DOCUMENTS

| | | |
|---|---|---|
| CN | 1405352 A | 3/2003 |
| DE | 19701443 A1 | 7/1988 |
| DE | 19622164 C1 | 5/1997 |
| DE | 69909305 T2 | 4/2004 |
| EP | 1002884 A1 | 5/2000 |
| EP | 1411140 A1 | 4/2004 |
| EP | 2700731 A1 | 2/2014 |
| JP | 1088233 A | 4/1998 |
| JP | 10324953 A | 12/1998 |
| JP | 2012233255 A | 11/2012 |
| JP | 201372110 A | 4/2013 |
| JP | 2015081359 A | 4/2015 |
| WO | 2016055227 A1 | 4/2016 |

* cited by examiner

*Primary Examiner* — Daniel J. Schleis
(74) *Attorney, Agent, or Firm* — The Webb Law Firm

(57) ABSTRACT

A flat steel product which, following a 5% biaxial deformation, exhibits, on one surface, a Wsa(1-5) value of <0.35 μm, a planar anisotropy Δr of −0.5 to +0.5 and, from the surface to a depth of <200 μm, and a nanohardness of >0.1 to <3.0 GPa. Also, a method of making the product where a slab including (in wt. %) 0.0003-0.050% C, 0.0001-0.20% Si, 0.01-1.5% Mn, 0.001-0.10% P, 0.0005-0.030% S, 0.001-0.12% Al, and 0.0001-0.01% N, the remainder Fe and impurities is heated to 1200-1270° C., rough-rolled with a reduction of 80-90%, and finish-hot-rolled at 850-950° C. with a reduction of 85-95%, for a total deformation of 95-99.5%. The reduction in the last hot roll pass is 1-25%, and the product is cooled at 4-30 K/s to a coiling temperature of 620-780° C. Following pickling, the product is cold-rolled with a total degree of deformation of 70-90% and recrystallization annealed at 650-900° C.

16 Claims, No Drawings

METHOD FOR MANUFACTURING FLAT STEEL PRODUCTS AND FLAT STEEL PRODUCT

CROSS-REFERENCE TO RELATED APPLICATIONS

This application is the United States national phase of International Application No. PCT/EP2017/073027 filed Sep. 13, 2017, and claims priority to International Application No. PCT/EP2016/072281 filed Sep. 20, 2016, the disclosures of which are hereby incorporated by reference in their entirety.

BACKGROUND OF THE INVENTION

Field of the Invention

The invention relates to a method for manufacturing a flat steel product and a corresponding flat steel product.

DESCRIPTION OF RELATED ART

When reference is made in the following to a flat steel product, then this means rolled products such as steel strips or sheets from which blank cuts or panels are separated for the manufacture of, for example, bodywork parts.

When compositions of materials are stated in the following, then the individual contents stated in each case refer to the weight, unless otherwise expressly stated. In contrast, specifications of compositions of atmospheres relate to the volume.

As a result of the changeover to a primerless painting of components used for example in car bodywork construction, increasing attention is being focused on the topic of "long waviness" in external car bodywork parts.

The long waviness of unpainted components or sheets can be characterised through the Wsa value "Wsa(1-5)", which covers height differences in waves with a wavelength of between 1 to 5 mm which are visible to the naked eye.

For external car bodywork, peak counts of at least 75/cm as well as a Wsa value of max. 0.35 µm on the 5%-deformed Marciniak cup should be complied with. The tool necessary in order to form sheet samples into a "Marciniak cup" and the procedure followed in creating such samples are described in ISO 12004-2:2008 (see: 4.3.4; Forming Limit Curve, FLC), wherein the measurement is carried out on the 5% biaxially deformed sheet.

Previous measures for creating thin sheets with optimised surface properties initially only concentrated on the improvements to be achieved during the skin-pass rolling which concludes the manufacturing process. However, it transpired that it is difficult to reliably maintain a Wsa value of max. 0.35 µm on the 5%-deformed Marciniak cup, particularly in the case of softer IF steels or steels with bake-hardening properties. In contrast, higher-strength steels have proved less problematic.

One example of such a prior art is described in WO 2016/055227A1. The method described therein leads to a cold-rolled and recrystallisation-annealed flat steel product with ferritic microstructure which possesses an optimised formability and suitability for painting. For this purpose it consists of a steel with (in % by weight) C: 0.0001-0.003%, Si: 0.001-0.025%, Mn: 0.05-0.20%, P: 0.001-0.015%, Al: 0.02-0.055%, Ti: 0.01-0.1%, as well as, in each case optionally, Cr: 0.001-0.05%, V: up to 0.005%, Mo: up to 0.015%, N: 0.001-0.004%. The flat steel product thereby has the following mechanical properties: Rp0.2≤180 MPa, Rm≤340 MPa, A80≤40%, n value≤0.23. In addition, on at least one of its surfaces it has an arithmetical mean roughness Ra of 0.8-1.6 µm and a peak count RPc of 75/cm. For the manufacture, the flat steel product is recrystallisation-annealed in a continuous throughfeed process under an $N_2$—$H_2$ annealing atmosphere and subjected to ageing. The flat steel product is then finished with a work roll with a skin pass level of 0.4-0.7%, the circumferential surface of which possesses a mean roughness Ra of 1.0-2.5 µm and a peak count of 100/cm, wherein the depressions and peaks formed in the surface of the skin-pass work roll are stochastically distributed. The aim of this procedure is to keep the Wsa1-5-0% value as low as possible when still in the undeformed state so that during later forming it does not deteriorate to unacceptable values as a result of the stresses which occur. Due to the use of smooth skin-pass rolls, less waviness is thereby supposed to be transferred to the metal strip. However, this approach is subject to limitations, because very smooth skin-pass rolls tend to leave imprints on the flat steel product and because, as a rule, or for other technical reasons, certain minimum requirements are placed on the surface texture of the skin-pass rolls.

In addition to this prior art, a method for manufacturing a cold-rolled flat steel product from a steel which contains (in % by weight) 0.0005-0.0035% C, max. 0.05% Si, 0.1-0.6% Mn, max. 0.02% P, less than 0.02% S, 0.01%-0.10% Al, max. 0.0030% N and at least 0.0010% B, wherein the B content and the N content fulfil the condition B/N≤3.0 where B/N=(B(mass %))/10.81)/(N(mass %)/14.01) and wherein the remainder of the steel alloy consists of Fe and unavoidable impurities is known from EP 2 700 731 A1. The structure of the cold-rolled flat steel product is characterised by a mean integrated intensity fin the (111)[1-10] to (111)[-1-12] orientations in a plane parallel to the surface of the flat steel product at a distance from the surface of the flat steel product, which corresponds to a quarter of the thickness of the flat steel product, of at least 7.0. At the same time, the average diameter of the ferrite grains in cross section in the rolling direction is at least 6.0-10.0 µm. In addition, for the Young's modulus "E", the conditions $E_{AVE}$≥215 GPa, $E_0$≥210 GPa, $E_{45}$≥210 GPa, $E_{90}$≥210 GPa, and -0.4≤Δr≤0.4 are fulfilled. In one exemplary embodiment, such a sheet is created in that a slab is heated to 1200° C. and then hot-rolled at a final hot-rolling temperature of 880-890° C. The obtained hot strip is coiled at 560-650° C. and then, following a pickling treatment, cold-rolled. The degree of deformation achieved through the cold-rolling thereby amounts to 86-93.5%, so that the obtained cold strip has a thickness of 0.225-0.26 mm. The cold strip is then annealed at 660-730° C. in a throughfeed process over a period of 30 s. Finally, the annealed cold strip undergoes a skin-pass rolling with a degree of deformation of 2.0%. The aim of this procedure is to produce flat steel products with higher values for the Young's modulus, which should guarantee a high degree of rigidity of the components formed from this sheet. However, the problem of the surface waviness which occurs in the cold-rolled flat steel products produced in this way or other aspects of the surface properties are not taken into consideration.

Finally, DE 196 22164 C1 discloses a method for producing a cold-rolled steel sheet or strip with good formability, in particular stretch-forming capability, for the manufacture of pressed parts with high dent resistance from a steel with the following composition (in mass %): 0.01-0.08% C, 0.10-0.80% Mn, max. 0.60% Si, 0.015-0.08% Al, max. 0.005% N, 0.01-0.04% in each case Ti and/or Nb, max.

0.15% Cu and/or V and/or Ni, the remainder iron, in which a cast slab is pre-heated to a temperature above 1050° C. and then hot-rolled at a final temperature which lies above the Ar3 temperature and can reach up to 950° C. The obtained hot strip is then coiled at temperatures of 550 to 750° C. and then cold-rolled with a total degree of deformation of 40 to 85%. The cold-rolling is followed by a recrystallisation annealing of the cold strip at a temperature of at least 720° C. in a continuous furnace. Finally, following cooling at 5 to 70 K/s, the obtained cold strip undergoes skin-pass rolling. With this method too, the emphasis is not on optimising the surface properties but on achieving particular mechanical properties in the flat steel product being produced.

Against the background of the prior art explained above, the invention was based on the problem of providing flat steel products with the composition typical of soft IF steels or bake-hardening steels and optimised surface properties, and to name a way of producing such flat steel products in a reliable manner.

With respect to the method, the invention has solved this problem in that the working steps listed in claim 1 are performed during the manufacture of a flat steel product.

A flat steel product produced according to the invention and exhibiting corresponding properties has the features listed in claim 8.

Advantageous embodiments of the invention are defined in the dependent claims and, like the general concept of the invention, are explained in detail in the following.

SUMMARY OF THE INVENTION

According to the invention, the method according to the invention for manufacturing flat steel products which, following a five percent biaxial deformation, exhibit, on at least one of their surfaces, a Wsa(1-5) value of less than 0.35 μm, a planar anisotropy Δr of −0.5 to +0.5 and, in a region which extends from the surface of the respective flat steel product to a depth of less than 200 μm, a change ΔH in the nanohardness H of more than 0.1 GPa and less than 3.0 GPa, comprises the following working steps:

a) Providing a slab which is made of a steel which consists (in % by weight) of
  C: 0.0003-0.050%
  Si: 0.0001-0.20%
  Mn: 0.01-1.5%
  P: 0.001-0.10%
  S: 0.0005-0.030%
  Al: 0.001-0.12%
  N: 0.0001-0.01%
  as well as, in each case optionally, one or more elements from the group "Ti, Nb, B, Cu, Cr, Ni, Mo, Sn", provided that
  Ti: 0.0001-0.15%
  Nb: 0.0001-0.05%
  B: ≤0.005%
  Cu: ≤0.15%
  Cr: ≤0.15%
  Ni: ≤0.15%
  Mo: ≤0.10%
  Sn: ≤0.05%
  the remainder consisting of Fe and unavoidable impurities;
b) heating the slab in a furnace to a slab drawing temperature Bzt of 1200-1270° C. at which the slab is drawn out of the furnace;
c) hot-rolling the slab into a 3-5 mm thick hot-rolled flat steel product, wherein the hot-rolling comprises a rough rolling with a thickness reduction of 80-90% and a finishing rolling with a thickness reduction of 85-95%, wherein the overall degree of deformation achieved during the hot-rolling is 95 99.5%, wherein a thickness reduction ΔdF of 1-25% is achieved in the last roll pass and wherein the final hot-rolling temperature is 850-950° C.;
d) cooling the obtained hot-rolled flat steel product to a coiling temperature of 620-780° C., wherein the cooling rate is 4-30 K/s;
e) coiling the hot-rolled flat steel product into a coil;
f) pickling the hot strip to remove the scale;
g) cold-rolling the hot-rolled flat steel product into a cold-rolled flat steel product, wherein the total degree of deformation achieved through the cold-rolling is 70-90%;
h) recrystallisation annealing of the cold-rolled flat steel product at an annealing temperature of 650-900° C., wherein the annealing is, optionally, carried out under a decarburising annealing atmosphere;
i) optional skin-pass rolling of the cold-rolled flat steel product with a skin pass level of 0.3-2.0%;

wherein the slab drawing temperature Bzt, the total residence time GLZ which the slab spends in the annealing furnace between being pushed in and drawn out, the thickness reduction in the last hot roll pass ΔdF and the coiling temperature HT satisfy the following condition:

$$-0.529653*Q + 0.944372*HT\_t + 0.711559*\Delta dF\_t < -0.1889459$$

where $Q = ((Bzt/GLZ) - 5.55281°\ C./min)/(1.777359°\ C./min)$
  Bzt: slab drawing temperature in ° C.
  GLZ: total residence time in min
  $HT\_t = (HT - 728.13030°\ C.)/42.300114°\ C.$
  HT: coiling temperature in ° C.
  $\Delta dF\_t = (\Delta dF - 12.43384\%)/2.306328\%$
  ΔdF: thickness reduction in the last hot roll pass in %.

Accordingly, the flat steel product according to the invention is a cold-rolled flat steel product which is made of a steel which consists (in % by weight) of
  C: 0.0003-0.050%,
  Si: 0.0001-0.20%,
  Mn: 0.01-1.5%,
  P: 0.001-0.10%,
  S: 0.0005-0.030%,
  Al: 0.001-0.12%,
  N: 0.0001-0.01%,
  as well as, in each case optionally, one or more elements from the group "Ti, Nb, B, Cu, Cr, Ni, Mo, Sn", provided that
  Ti: 0.0001-0.15%,
  Nb: 0.0001-0.05%,
  B: ≤0.005%,
  Cu: ≤0.15%,
  Cr: ≤0.15%,
  Ni: ≤0.15%,
  Mo: ≤0.10%,
  Sn: ≤0.05%,
  the remainder consisting of Fe and unavoidable impurities
and
  which possesses, on at least one of its surfaces, at a five percent biaxial deformation, a low waviness which is characterised by a Wsa(1-5) value of less than 0.35 μm, wherein the flat steel product exhibits a planar anisotropy Δr of −0.5 to +0.5 and, in a region which extends from the relevant surface of the respective flat steel product to a depth of less than 200 µm, a nanohardness H of more than 0.1 GPa and less than 3.0 GPa.

DESCRIPTION OF THE INVENTION

Unlike the prior art appraised above, which is substantially based on a special annealing process with subsequent skin-pass rolling, which is also specially adapted, the invention is based on the knowledge that, fundamentally, each working step of a manufacturing process influences the Wsa(1-5) value which can be measured on the finished cold-rolled flat steel product. Through a holistic consideration, in terms of materials science, of the processes taking place within the substrate over the course of the entire process, the invention has thereby developed specifications for the individual working steps of the method according to the invention as a result of which the negative influences of the respective working steps on the Wsa(1-5) value are as far as possible ruled out. The mutual dependency of the process parameters to be complied with in the individual working steps according to the invention is thereby expressed through the condition, in the form of a formula $$-0.529653*Q+0.944372*HT\_t+0.711559*\Delta dF\_t<-0.1889459$$

This condition takes into account, via the factor Q=((Bzt/GLZ)−5.55281° C./min)/(1.777359° C./min), with the slab drawing temperature Bzt and the total residence time GLZ, the parameters relevant for the heating of the slab, as well as the key variables influencing the Wsa(1-5) value in the hot-rolling process which takes place following the heating of the slab, namely the coiling temperature HT_t and, via the parameter $\Delta dF\_t=(\Delta dF-12.43384\%)/2.306328\%$, the thickness reduction $\Delta dF$ achieved in the last pass of the hot-rolling process.

The waviness parameters Wsa(1-5) of a flat steel product produced according to the invention and exhibiting corresponding properties are thereby, as already explained above in connection with the prior art explained above, determined on a 5%-deformed Marciniak cup. The measurement of the waviness parameter Wsa(1-5) is carried out in accordance with the Stahl-Eisen-Prüfblatt (test specification for iron and steel) SEP 1941 (1st edition May 2012). However, in this case, in departure from the specifications of SEP 1941, the Wsa(1-5) value is measured, not transversely to, but along the rolling direction.

As target value for the invention it was specified that, at a five percent biaxial deformation, the Wsa(1-5) value may only increase by a maximum of 0.05 µm, i.e. that the difference $\Delta$Wsa between the Wsa(1-5) value before and after the 5% deformation may amount to a maximum of 0.05 µm. The hot strip grain size, the peak of the texture {111}<110> determined, in a manner known per se, in a texture analysis according to Wassermann, G. (1970), H.-J. Bunge, Mathematical Methods of Texture Analysis, Akademie-Verlag Berlin 1969, 330 pages Geb. M 68.-. Krist. Techn., 5: K23. doi:10.1002/crat.19700050319, the precipitation value, the planar anisotropy $\Delta$r, the HTC softening as well as the hardness curve from the nanoindentation measurement were determined as the material characteristics with decisive influence on the change in the Wsa(1-5) value over the course of deformation, and the following stipulations were defined for these characteristic values which, on being fulfilled, in each case result in cold-rolled flat steel products according to the invention with particularly optimised surface waviness being obtained:

The average grain size, determined according to DIN EN ISO 643, in the structure of the hot-rolled flat steel product obtained as an intermediate product in the method according to the invention, should preferably be 10-18 µm. The higher the slab drawing temperature Bzt, the greater the probability that the later hot strip will have a coarser grain size. The hot strip grain size is thus an indication of an excessively high slab drawing temperature Bzt. A high slab drawing temperature Bzt leads to more precipitates originating from the steel production process in the steelworks, preferably carbides, carbonitrides and sulphides, being dissolved. Since these are dissolved, they can no longer function as impediments to the growth of the grains of the structure of the slab and hot strip. The grains can thus grow without hindrance. Coarser hot strip grains are slower to recrystallise than smaller hot strip grains and pass on this property into the structure of the cold strip. Coarser hot strip grains are significantly less efficient than smaller hot strip grains in absorbing the energy induced in the cold-rolling process, which is required for the subsequent recrystallisation annealing. This makes the recrystallisation during the annealing significantly more sluggish, which leads in turn to high $\Delta$r values. The grain size should not be less than 10 µm, because with decreasing grain size the flat steel product exhibits higher strengths, which has an adverse affect on its formability. The grain size should not be greater than 18 µm, because with larger grains the absorption of energy through the cold-rolling process is impaired. This leads to a lower driving force for the subsequent recrystallisation, which has a negative influence on the texture, and thus the $\Delta$r value in turn would become too high.

The peak of the texture of the cold strip with an orientation of the gamma fibres of {111}<110> should preferably lie at 8.5-10.5. If this range is maintained, minimised $\Delta$r values are achieved. The $\Delta$r value representing the planar anisotropy is calculated as follows:

$$\Delta r = (r\_long + r\_trans - 2*r\_diagonal)/2$$

r_long is thereby the r-value determined longitudinally to the rolling direction, r_trans is the r-value determined transversely to the rolling direction and r_diagonal is the r-value determined at an angle of 45° to the rolling direction. Studies have shown that the differences in the r-values r_long, r_trans and r_diagonal in relation to the rolling direction differ widely from one another and the $\Delta$r value cannot reliably be adjusted between −0.5 and +0.5 if the texture peak is less than 8.5 or greater than 10.5.

A standardised measuring method for determining the texture is not available. However, the texture can be determined through measurement of pole figures with an X-ray diffractometer and subsequent mathematical calculation by means of the series expansion method according to Bunge (H.-J. Bunge: "Mathematical Methods of Texture Analysis", Akademie-Verlag Berlin, 1969 and H.-J. Bunge: "Texture Analysis in Material Science", Butterworth London, 1983).

The average size of the precipitates in the cold strip determined according to DIN EN ISO 10247 should preferably be 60-150 nm. The finer the precipitates which are present prior to the recrystallisation annealing, the greater the risk that they will impede the recrystallisation intended with the annealing. The precipitates should therefore not be smaller than 60 nm.

However, precipitates which are larger than 150 nm have a negative influence on the surface appearance. In order to achieve Wsa values of at most 0.35 μm, the precipitates should not exceed an average size of 150 nm.

The planar anisotropy of the flat steel product determined according to DIN EN ISO 6892-1:2009 should preferably amount to −0.5 to 0.5.

The nanoindentation, i.e. the difference ΔH between the nanohardness of a region starting out from the surface of the flat steel product to a depth of 25 μm and the nanohardness of a deeper region more than 25 μm distant of the surface of the flat steel product, should, in a flat steel product according to the invention, optimally be −0.3 MPa to 0.4 MPa. The normal anisotropy is the anisotropy over or in the direction of the sheet thickness.

One measure for the normal anisotropy is local differences in the hardness curve determined over the sheet thickness. In the present application, a distinction is made between two regions: 1) a near-surface region, which begins on the steel substrate surface and extends from 0 to 25 μm from the surface into the sheet thickness; 2) a deeper region which extends from a distance of 25 μm from the surface into the middle of the sheet thickness and includes the remainder of the sheet thickness. This deeper region is also referred to as bulk.

"H" is understood to refer to an absolute nanohardness which is measured in GPa. The nanoindentation is thereby determined according to DIN EN ISO 14577-1/-2/-4. Within the near-surface region, at least one nanohardness value H is measured. Typically however, as a rule at least three nanohardness values are measured at equidistant intervals over the sheet thickness and arithmetically averaged, wherein all the measured values are recorded intragranularly. At least one nanohardness value is also measured within the deeper region. Typically, here too at least five intragranular nanohardness values are measured at equidistant intervals over the sheet thickness and arithmetically averaged. Where reference is simply made, in the present case, to "nanohardness", then this means the at least one measured value, but as a rule the average value from several individual measured values.

In a region extending from the surface of the respective flat steel product to a depth of less than 200 μm, the nanohardness H should have value of more than 0.1 GPa and less than 3.0 GPa, preferably 1.0 GPa to 2.5 GPa. The nanohardness should not be greater than 3.0 GPa in this region in order to ensure sufficiently good flow properties and formability, in order to avoid local material necking and, accordingly, to reduce the surface waviness.

"ΔH" designates the difference calculated from the nanohardness of a near-surface region H_25 μm and the nanohardness of a deeper region H_bulk, which is also referred to as bulk hardness. ΔH is positive if the surface hardness is greater than the bulk hardness. ΔH is negative if the bulk hardness is greater than the surface hardness. ΔH should not be less than −0.3 MPa and not more than 0.4 MPa in order to avoid an irregular flow behaviour of the cold strip during deformation and resulting waviness. In the case of greater hardness differences, a difference can be observed in the flow behaviour of near-surface (depth: 0-25 μm) and deeper (depth: >25 μm) regions during forming. The regions of lesser hardness deform more in comparison with regions of greater hardness, as a result of which unevenness in the form of waviness can be created on the surface.

The HTC softening determined at 2000 s and 650° C. should preferably amount to 86-100%. "HTC softening" should be understood to mean the softening of the material during the recrystallisation process. The HTC softening is a measure for the recrystallisation behaviour of the steel. The more poorly or slowly a sample recrystallises, the more likely it is that the material will exhibit anisotropic properties. The risk of a pronounced waviness increases with increasing anisotropy.

The HTC softening is determined by means of a high-temperature conductivity measurement (HTC measurement) carried out on full-hard cold strip. The measuring method is not covered by any standard. In order to carry out the HTC measurement, a U-formed sample with a web width of 1 mm is separated from a sheet by means of wire erosion. A wire is attached at each end of the sample by means of a spot welding method. During the annealing process, at defined temperature and under argon protective gas atmosphere, the electrical voltage of the sample is measured via these measuring wires and the electrical conductivity calculated from this. During recrystallisation, the electrical conductivity increases, which represents a measure for the softening. The HTC softening determined in this way at 2000 s and 650° C. should amount to at least 86% in order to guarantee a Δr value between −0.5 and +0.5 and thus a low waviness.

The method according to the invention is suitable in particular for the production of cold-rolled flat steel products with optimised waviness provided with an in particular Zn-based corrosion protection coating.

Unless otherwise expressly stated, the findings and stipulations described in the present description apply both to uncoated flat steel products but also to ones provided with a Zn-based protective coating.

The Zn-coating can consist of a coating substantially consisting exclusively of Zn, applied in a conventional manner (coating type "Z") or of a Zn alloy, in particular a ZnMg alloy (coating type "ZM"). The coating can be applied by means of hot-dip coating or electrolytic coating. In addition, given a corresponding composition, the coating may have been subjected to a galvannealing treatment (coating type "ZF"). Examples of possible compositions of hot-dip baths in which flat steel products produced according to the invention can be coated with a Zn-coating of the type provided for according to the invention include (contents stated in % by weight, wherein, for the contents named herein, in each case indicative values have been stated for which the tolerances typical in practice apply):

a) 0.2% Al, traces of Fe and Pb, the remainder Zn and unavoidable impurities (coating type "Z"),
b) 1% Al, 1% Mg, traces of Fe and Pb, the remainder Zn and avoidable impurities (coating type "ZM"),
c) 0.1% Al, traces of Fe and Pb, the remainder Zn and unavoidable impurities for galvannealed sheets (coating type "ZF").

When reference is made in the present application to a Wsa value, then this means the measured Wsa(1-5) value in the 5% biaxially deformed state according to SEP 1941 of an uncoated or coated sheet. In so far as reference is also made in the exemplary embodiments of the present application to a "Wsa 0%" and a "Wsa 5%", "Wsa 5%" means the Wsa(1-5) value in the 5% biaxially deformed state according to SEP 1941. Analogously, "Wsa 0%" is the Wsa(1-5) value in the 0% biaxially deformed state, i.e. in the undeformed state, according to SEP 1941.

The Wsa1-5 value is a waviness parameter which is essentially analogous to the arithmetical mean roughness value (same calculation), whereby, however, in contrast to the latter, very short wavelengths of max. 0.8 mm are not considered, only wavelengths of 1 to 5 mm. In order to determine the Wsa1-5 value, as when determining the mean roughness value, starting out from a profile centre line the wave crests above the profile centre line as well as wave troughs below the profile centre line are added through integration and the total area determined in this way is then divided by the measuring length. This produces a one-dimensional value, stated in µm, which corresponds to the average wave height in the wavelength range from 1 mm to 5 mm. The Wsa 1-5 value can be measured both on flat, undeformed sheets (Wsa 1-5-0% value) and also on 5% biaxially deformed sheets (Wsa 1-5-5% value).

When reference is made in the present application to a $Wsa_{mod}$ value, then this refers solely to the inherent waviness of the corrosion protection layer, i.e. the coating of the coated sheet. In contrast to the Wsa(1-5) value of an uncoated or coated sheet, the $Wsa_{mod}$ value is derived from the measurement of the coating distribution of the corrosion protection layer by means of a spatially resolved, scanning x-ray fluorescence analysis (Fischerscope X-ray) according to DIN EN ISO 3497 carried out on surfaces measuring 20×20 mm. The $Wsa_{mod}$ value thus embodies the Wsa1-5 value of the pure coating and not of the entire flat steel product coated with the coating. The influence of the pure coating, uninfluenced by the steel substrate, can thus be deduced through the determination of the $Wsa_{mod}$ value. The coating thicknesses determined per scan over the entire surface through the x-ray fluorescence analysis can then be converted into a Wsa1-5 value of the coating using a known image processing software currently available on the market.

The cut-off wavelengths for determining the Wsa value and the $Wsa_{mod}$ value are $\lambda c=1$ mm and $\lambda f=5$ mm. The cut-off wavelength is the wavelength at which the profile filter reduces the amplitude of a sine wave to 50%. It can be understood as a measure for the boundary between roughness and waviness. The cut-off wavelength $\lambda f$ delimits the waviness in relation to longer wavelengths.

The invention is based on the knowledge that the deterioration in the Wsa value of flat steel products made of soft IF steels or bake-hardening steels following forming is attributable to inhomogeneous material properties. In order to counter this, the invention has suggested measures in order to optimise the anisotropy and the surface-measurable waviness of such flat steel products.

The planar anisotropy $\Delta r$ has primarily been used as a measure for the different plastic flow behaviour of the material in the plane of the sheet from out of the thickness and in different directions relative to the rolling direction. The planar anisotropy $\Delta r$ is determined in accordance with DIN EN ISO 6892-1:2009. Mechanical tensile test specimens are thereby tested in three directions "longitudinally", "transversely" and "diagonally" to the rolling direction and the planar anisotropy is then determined according to the formula $\Delta r=(r0°+r90°-2xr45°)/2$. The closer this value is to 0, the more isotropic the material behaviour during forming. It could thereby be shown that the $\Delta r$ value determined in this way correlates with the $\Delta Wsa$ value which is to be limited according to the invention.

The "normal anisotropy" is also considered. The nano-hardness curve can be considered as a measure for this characteristic value. For this purpose it is necessary to know the curve of the mechanical properties of the material over the sheet thickness, since it is to be assumed that a deterioration in the Wsa value ($=\Delta Wsa$) resulting from forming is attributable to a locally limited near-surface region which is hardened or stronger in comparison with the interior of the material. The near-surface layer can thereby be softer than the deeper layer, as for example in the case of decarburated surface layers. However, it can also exhibit a greater hardness than the deeper layer, as is for example the case with case-hardened materials.

The greater the hardness difference $\Delta H$ in the near-surface region and the thinner the near-surface region in which a hardness maximum is present (=steep "bathtub profile of the hardness curve"), the greater the potential for a deterioration of the Wsa value due to forming. The causes of this are various and are attributable to a higher dislocation density in the near-surface region, for example as a result of the skin-pass process, an incompletely recrystallised first grain layer, especially in the case of soft, Ti-stabilised IF steels, solid solution strengthening through oxydic and similar precipitates at the surface as well as, in the case of BH steels, carbon enrichment at the surface.

Especially in the case that the flat steel product according to the invention is coated with a metallic corrosion protection coating, in particular a Zn-coating, in addition to considering the substrate it is also necessary to consider the influence of the coating on the long waviness in order to be able to judge the substrate-coating system as a whole. A suitable method for this purpose is x-ray fluorescence (Fischerscope X-Ray) according to DIN EN ISO 3497, in which the zinc layer distribution over a defined surface region is scanned and the influence of the substrate is filtered out using suitable filters. In this way, only the long waviness content of the coating is considered, which is influenced directly through the nozzle parameters and the skin-pass process. A special mathematical algorithm is used to convert the waviness visible to the naked eye into an objective characteristic value (see SEP 1941) for evaluation.

The slab drawing temperature Bzt amounts to a maximum of 1270° C., with a lower limit of at least 1200° C. At such slab drawing temperatures Bzt limited within the range from 1200-1270° C., the Mn sulphides contained in the steel of the slab are not dissolved. The dissolution of the MnS precipitates can in particular be prevented if the slab drawing temperature Bzt is less than 1250° C. The slab drawing temperature has a lower limit of 1200° C. because, below this temperature, due to the lack, in this case, of a temperature buffer, there is a risk of a ferritic conversion already in the finishing section of the hot-rolling line. This is undesirable because this would be associated with negative effects on the mechanical properties. Moreover, the wear on the bearing blocks in the furnace could increase significantly. The total residence time GLZ of the slab in the furnace is dependent on its length. An adequate heating-through would not be achieved with a total residence time of less than 180 minutes, which would in turn give rise to the risk of ferritic transformation in the finishing section. In contrast, with a total residence time of more than 400 minutes, too many of the precipitates in the slab originating from the production of the slab at the steelworks would be dissolved By setting comparably low slab drawing temperatures it is thus achieved that the precipitates not dissolved in the slab furnace, in particular manganese sulphides, titanium carbides, titanium nitrides, titanium carbonitrides, copper sulphides and manganese sulphides and the like are also not dissolved during the subsequent hot-rolling processes, then forming fine precipitates in the hot strip. The creation of such fine precipitates should be avoided. The size of the precipitates as well as their distribution are decisive for the success of the invention, since the recrystallisation process can be influenced through the presence of fine precipitates. The smaller and more finely distributed the precipitates in the hot strip, the more recrystallisation is impeded and consequently the r-value, the $\Delta r$ value and ultimately also the $\Delta Wsa$ value of the flat steel product, which depends directly on the $\Delta r$ value, deteriorate.

The invention thereby takes into account the influence which the complex interplay between the slab drawing temperature Bzt set within the range according to the invention and the total residence time GLZ which the slab spends in the annealing furnace between being pushed in and drawn out, on the one hand, as well as the thickness reduction in the last hot roll pass $\Delta dF$ and the coiling temperature HT on the other hand, has on the quality of the end product obtained according to the invention and in particular its nanohardness (bulk and surface), through the following condition which must be fulfilled according to the invention:

$$-0.529653*Q+0.944372*HT\_t+0.711559*\Delta dF\_t<-0.1889459$$

where $Q=((Bzt/GLZ)-5.55281°\ C./min)/(1.777359°\ C./min)$

Bzt: slab drawing temperature in ° C.
GLZ: total residence time in min
$HT\_t=(HT-728.13030°\ C.)/42.300114°\ C.$
HT: coiling temperature in ° C.
$\Delta dF\_t=(\Delta dF-12.43384\%)/2.306328\%$
$\Delta dF$: thickness reduction in the last hot roll pass in %

The formulation of this condition is based on the knowledge that the key influencing parameters for the processing of the slabs in the so-called roughing train preceding the hot-rolling, the slab drawing temperature Bzt and total residence time GLZ, on the one hand, as well as the hot-rolling and cooling section parameters on the other hand, are responsible for the formation of a particular texture in the finished flat steel product, which is then expressed in a particular $\Delta r$ value.

The combination of slab drawing temperature Bzt and total residence time GLZ influences the dissolution and formation of precipitates in the slab, since very high temperatures and, in comparison with the actual hot-rolling process, also very long process times of several hours prevail there. For example, precipitates produced earlier during the solidification of the melt into the slab are dissolved during the course of the annealing of the slab, other new precipitates are formed and others again remain present, i.e. they are not dissolved. This dissolution, formation and non-dissolution of precipitates interacts directly with the parameters of the hot-rolling and the cooling section parameters and thus has a decisive influence on the structure of the hot strip.

The conditions specified according to the invention for the furnace residence time GLZ and the slab drawing temperature Bzt are selected such that coarse precipitates in the slab are not dissolved. In contrast, with excessively high slab drawing temperatures or excessively long annealing times, relative coarse precipitates in the slab originating from the solidification process would dissolve. As a result, the hot strip grain would initially be able to grow without hindrance during the rolling processes. After the slab has been drawn out of the furnace, the temperature of, firstly, the slab and then of the hot strip rolled out of it decreases steadily. As a result the pressure to form precipitates in the processed steel material increases with the consequence that the precipitates previously dissolved in the slab in the furnace are formed again, but are no longer coarse, but in a much finer form than following the solidification of the steel melt. This refinement is attributable to the fact that in hot-rolling processes the temperatures are significantly lower than when the melt is cast into the slab.

In contrast, the slab drawing temperature Bzt and total residence time GLZ according to the invention are deliberately selected such that the dissolution of the coarse precipitates and consequently the formation of fine precipitates is prevented, since fine precipitates, i.e. precipitates with an average size of for example less than 60 nm, would impede recrystallisation.

The nanohardness (bulk and surface) also tends to be influenced through the roughing train parameters slab drawing temperature Bzt and total residence time GLZ. The annealing of the slabs in the reheating furnace takes place at high temperatures under an atmosphere typically consisting to 65-75 vol % of nitrogen. Based on an Arrhenius approach, under these conditions a diffusion of N in r-Fe occurs, and thus a nitridation, i.e. a nitrogen enrichment, in the surface of the slab. The thickness region affected by the nitridation extends, starting out from the exposed surface of the slab, to a depth of approx. 3 mm. The nitrogen enrichment which takes place in this region is associated with a hardening of the surface. Starting out from a typical slab thickness of 255 mm, with a thickness of the nitrogen-enriched region of 3 mm, in a 0.65 mm thick flat steel product obtained with the method according to the invention this leads to a hardened layer of around 8 μm adjacent to the surface of the flat steel product.

In addition, compliance with the stipulations according to the invention during the annealing treatment has a positive effect on the minimisation of the nitridation of the slab surface through a nitrogen-containing furnace atmosphere. Typical furnace atmospheres contain 65-75 vol % nitrogen, 5-15 vol % $CO_2$, 15-25 vol % $H_2O$ and 1-2 vol % oxygen. A slab surface which is too highly enriched with nitrogen would lead to a near-surface hardened layer in the cold-rolled strip, wherein here too "near-surface" refers to a layer which typically extends, starting out from the exposed surface, to a depth of 0-25 μm. Through the stipulation according to the invention, the unavoidable nitridation is limited to such an extent that damaging effects on the finished product produced according to the invention are reduced to a minimum.

According to the invention the hot-rolling can be carried out in a conventional manner in several hot-rolling stages. For example, in practice hot-rolling mills are used for this purpose in which the hot strip is hot-rolled and finished in five or seven hot-rolling stages.

Depending on the hot-rolling technology available in each case, the hot-rolling can be divided, in a conventional manner, into a rough hot-rolling and a finishing hot-rolling. The rough rolling preceding the finishing rolling can thereby be carried out, again in a conventional manner, in reversing operation in order to produce from the slab a rough strip with a thickness suitable for the finishing hot-rolling. During rough rolling, the output temperature at which the rough-rolled strip leaves the roughing train should not lie below 1050° C. in order to prevent a premature ferritic transformation.

The alloy of the steel slabs provided according to the invention comprises so-called "soft IF steels" as well as steels with ultra-low C content ("ULC steels") which possess bake-hardening properties.

In Table 1, a typical alloy specification is in each case stated for a soft IF steel "Soft IF", for a ULC steel "ULC-BH" ("ULC"=Ultra Low Carbon) with bake-hardening properties and an ELC steel "ELC" ("ELC"=Extra Low Carbon) with pronounced bake-hardening properties, which are covered by the alloy specification specified by the invention for the slab processed according to the invention and the flat steel product with properties according to the invention.

The alloy components provided for according to the invention have the following effects:

Carbon (C):

In the case of IF steels of the type in question here, carbon and nitrogen are completely bound through micro-alloying elements such as titanium and/or niobium. In this way, low yield strengths are achieved and freedom from flow lines is guaranteed. In this connection the C contents can amount to up to 0.05% by weight, wherein at C contents of at least 0.0003% by weight the favourable effects of the presence of carbon with respect to IF steels can be achieved with particular reliability. Preferably, C contents of at least 0.005% by weight or a maximum of 0.045% by weight are thereby achieved.

In the case of ULC steels with bake-hardening properties, in addition to the control of the forming properties, the control of the BH effect through the C content (possibly also the N content) is of great importance. Following deformation during the KTL process, the free carbon diffuses at the dislocations created through forming. In subsequent flow processes (forming processes), the carbon impedes the dislocation movement and the yield strength is increased. In this way, good forming properties during processing at the pressing plant are combined with higher yield strengths in the component following stove enamelling ("KTL"). The C content of ULC steels of the type processed according to the invention thereby optimally lies within the region of 0.0025% by weight, wherein contents of at least 0.0015% by weight or a maximum of 0.0035% by weight have proved particularly suitable in practice.

Nitrogen (N):

In order to support the effects explained above in connection with carbon, nitrogen can be present in the steels in each case processed according to the invention in contents of up to 0.01% by weight. This upper limit should not be exceeded in order to guarantee good forming properties and a good ageing behaviour of the steel. In order to be able to achieve the supporting effect reliably in practice, N contents of at least 0.0001% by weight can be expedient. The presence of N in the steel processed according to the invention can have a particularly positive affect with N contents of at least 0.0008% by weight. Adverse influences of the presence of N can be avoided particularly reliably in that the N content is limited to a maximum of 0.008% by weight.

Silicon:

Silicon is present in the steel of the slab provided according to the invention in contents of up to 0.2% by weight. Si acts as a solid solution hardener. It increases the yield strength and tensile strength of the steel. However, higher contents of silicon impair the forming behaviour. Reliable use can be made of the positive effects of Si in the steel processed according to the invention at contents of at least 0.0001% by weight. The presence of Si in the steel processed according to the invention has a particularly positive effect at Si contents of at least 0.0005% by weight. Adverse influences of the presence of Si can be avoided particularly reliably in that the Si content is limited to a maximum of 0.15% by weight.

Manganese:

Manganese forms MnS with sulphur and thus reduces the negative effect of any sulphur which may be present. At the same time, Mn also acts as a solid solution hardener and in this respect has the same effect as Si. Particularly reliable use can be made of the positive influence of Mn on the properties of the steel processed according to the invention in that the Mn content amounts to at least 0.01% by weight, in particular at least 0.03% by weight. Effective use can be made of the positive influences of the presence of Mn at contents of up to 1.5% by weight, in particular up to 0.8% by weight.

Phosphorus:

Phosphorus also increases the yield strength and tensile strength in iron alloys of the type in question here. However, phosphorus tends to lead to primary segregations during the solidification of the melt and to secondary segregations in the solid state through the pronounced narrowing of the gamma section. As a result of the relatively slow diffusion speed, both in the alpha solid solution and also in the gamma solid solution, any segregations can only be compensated again with difficulty, for which reason the P content of steels processed according to the invention is limited to 0.1% by weight, in particular a maximum of 0.08% by weight. Particularly reliable use can be made of the positive influence of P on the properties of steel processed according to the invention in that the P content amounts to at least 0.001% by weight, in particular at least 0.002% by weight.

Sulphur:

Sulphur is a by-element of steel which to a considerable degree causes segregations in steels of the kind in question here. At the same time, sulphur is responsible for red shortness in the steel. In order to avoid these negative consequences, the S content is limited to a maximum of 0.03% by weight, in particular a maximum of 0.025% by weight, wherein, as a result of the production process, S contents of at least 0.0005% by weight, in particular at least 0.001% by weight, are typical for the properties of the steels according to the invention.

Aluminium:

Aluminium is used in steelmaking as a powerful oxidiser for steel killing. Aluminium also forms nitrides with nitrogen. As a result it also improves the insensitivity of the steel to ageing. In small additions, it also supports the formation of fine grains. A steel processed according to the invention therefore contains 0.001-0.12% by weight Al. Particularly reliable use can be made of the positive influence of Al on the properties of steel processed according to the invention in that the Al content amounts to at least 0.005% by weight. Negative effects of the presence of Al can thereby be reliably avoided in that the Al content of the steel processed according to the invention is limited to a maximum of 0.09% by weight.

Titanium and Niobium (Optionally Added):

Titanium, in contents of up to 0.15% by weight, in particular up to 0.13% by weight, or niobium in contents of up to 0.05% by weight, in particular up to 0.01% by weight, can be present, on their own or in combination with one another, in the steel of the slab processed according to the invention. They serve the purpose of partially or completely binding C and N and thus reducing the ageing potential of the material. In addition, titanium and niobium influence the strength of the material both through the formation of precipitates as well as through solid solution hardening. The presence of Ti in the steel processed according to the invention has a particularly positive effect at Ti contents of at least 0.0001% by weight. Nb contents of at least 0.0005% by weight also prove particularly expedient in practice.

Boron (Optionally Added):

The content of boron is limited to 0.005% by weight, in particular 0.004% by weight, because in steels of the type in question here B impairs the forming properties, in particular the r-value, of the steel according to the invention. However, small additions of B can contribute to preventing susceptibility to brittle fracture. At least 0.0002% by weight B can be provided in the steel according to the invention for this purpose.

Copper, Chrome, Nickel, Molybdenum and Tin (Optionally Added):

In the steel of the slab processed according to the invention, Cu, Cr, Ni, Mo or Sn can be classed among the technically unavoidable impurities incorporated in the steel during the production process. Their contents, like the contents of other impurities, must, within the bounds of what is technically expedient and feasible, be kept so low that they have no adverse influences on the properties of the steel processed according to the invention. In this respect the invention stipulates an upper limit for the Cu, Cr and Ni contents of in each case max. 0.15% by weight, in particular of max. 0.12% by weight, for the Mo content an upper limit of max. 0.10% by weight, in particular max. 0.08% by weight, and for the Sn content an upper limit of max. 0.05% by weight, in particular max. 0.03% by weight.

The hot-rolling of the slab pre-heated in a manner according to the invention can be carried out in an essentially known manner. During the course of the hot-rolling, the slab can undergo a rough-rolling in which an initial thickness reduction by 80-90% is achieved. The slabs, which typically enter the roughing section with an initial thickness of 220-280 mm are, also typically, rough-rolled to a rough-rolled strip thickness of 30-50 mm.

The rough-rolled slab can be finishing hot-rolled, in an essentially known manner, in a conventionally equipped hot-roll finishing train in several passes, typically five or seven passes, into a hot strip with the required final thickness of typically 3-5 mm. The degree of deformation achieved in the hot-roll finishing train thereby typically amounts to 85-95%.

For the last roll pass of the hot-rolling, the rolling parameters are adjusted such that a thickness reduction $\Delta dF$ of 1-25%, in particular 5-20%, is achieved over the last hot roll pass, wherein thickness reductions $\Delta dF$ of 8-17% prove particularly favourable here. The thickness reduction $\Delta dF$ in the last finishing stand is thereby a direct indicator for the degree of deformation and embodies the last dynamic recrystallisation step before the ferritic transformation. The lower this degree of deformation, the lower the driving force for a recrystallisation immediately prior to the ferritic transformation through cooling, i.e. a frozen enforced state is avoided. Moreover, a low degree of deformation tends to result in a more globular austenitic grain. This geometry is then passed on to the ferritic grain following the transformation. Globular grains tend to be more isotropic.

The overall degree of deformation achieved through the hot-rolling (roughing+finishing) then typically amounts to 95-99.5% at a final hot-rolling temperature which, also typically, amounts to 850-950° C., in particular 910-950° C. The final hot-rolling temperature influences the grain size of the hot strip. The grain size is controlled by nucleation and grain growth. The more nuclei in the form of precipitates are present in the hot strip, the smaller the grain size, since these nuclei act as brakes on growth. The lower the final hot-rolling temperature, the more transformation nuclei are formed in the form of precipitates and the smaller the hot strip grain size. The final hot-rolling temperature is therefore limited to 950° C. according to the invention.

Following the end of the hot-rolling, the hot strip emerging from the last stand of the hot-roll train is cooled with a cooling rate of 4-30 K/s. Cooling rates of 10-22 K/s have proved particularly favourable here with respect to the profile of properties of the flat steel product to be produced which are to be achieved according to the invention. It tends to be the case here that the more rapid and thus higher the cooling rate, the better the properties which can be achieved in the end product, since the grain growth in the hot strip is inhibited and in addition less oxidation takes place. Smaller hot strip grains absorb the energy during the subsequent cold-rolling process better and consequently also display more driving force for the subsequent recrystallisation process, which improves the isotropy and thus reduces the $\Delta r$ value. Moreover, there are fewer interfering oxides in the near-surface region. Accordingly, the recrystallisation carried out following the cold-rolling process is scarcely impeded in this region. This tends to result in a more globular grain in the near-surface region and consequently an even nanohardness over the sheet thickness. At excessively high cooling rates >30 K/s the material becomes harder, at excessively low cooling rates <4 K/s softer, which would have a negative influence on the mechanical properties.

The cooling following the hot-rolling is preferably carried out "from the front", i.e. as far as possible immediately following the hot-rolling, for example within 0-4 seconds following the end of the hot-rolling. It is however also possible to carry out a cooling "from behind", i.e. at a certain interval in time following the hot-rolling, for example beginning the cooling following a pause time of more than 4 seconds.

During the course of the cooling, the hot strip is cooled to a coiling temperature of typically 620-780° C. This temperature range has also been selected taken into consideration the grain growth in the hot strip, because the coiling temperature also influences the grain size of the hot strip. At an excessively high coiling temperature, grain growth is stimulated. A coiling temperature range of 700-750° C. therefore proves particularly favourable for the purposes according to the invention. The range for the coiling temperature specified according to the invention has also thereby been selected taking into consideration the precipitation conditions achieved through the relationships between the slab drawing temperature BZT and the total residence time GLZ used in the invention and applied according to the invention. Moreover, the formation of very finely distributed Ti precipitates in the near-surface region is encouraged by a high coiling temperature. These precipitates primarily consist of Ti oxides which remain in place following the cold-rolling process. During the subsequent recrystallisation annealing, these then impede the near-surface grain orientation during recrystallisation, so only recovered, relatively elongated grains with a high dislocation density tend to be present there, which drive up the strength and thus also the hardness in the near-surface region.

Prior to the cold-rolling, the hot strip is, as is usual, freed of scale and other residues adhering to it, for which purpose a conventional pickling treatment is for example used.

The subsequent cold-rolling can be carried out in an equally usual manner. The total degrees of deformation thereby achieved lie within the range from 70-90%.

During the recrystallisation annealing carried out according to the invention, annealing temperatures of 650 to 900° C., in particular 720 and 880° C., are maintained.

The increase in the Wsa value during forming can be prevented particularly effectively in that the annealing is carried out under an annealing atmosphere with a comparatively high dew point of more than −15° C., since in this case approx. 10 ppm carbon is removed in a near-surface region extending over a depth of 10-50 μm. For this purpose, the recrystallisation annealing can take place in a throughfeed process at an annealing temperature of 650-870° C. with a throughput speed of 70-180 m/min and a dew point of the annealing atmosphere of +15° C. to −50° C.

If the slab consists of a composition typical for example of a bake-hardening steel with minimised C content or a ULC steel then, even if this can adversely affect the bake-hardening properties, in order to optimise the Wsa value it can be expedient to reduce the free C content at the surface in order to match the strength properties in the near-surface region to the volume of the sheet. This can be achieved through a decarburising annealing, optimally carried out in a throughfeed process and in combination with the recrystallisation annealing, in which the cold-rolled flat steel product is annealed at annealing temperatures which lie within the range from 650° C.-870° C., in particular at least 800° C., and a throughput speed of 70-180 m/min under an annealing atmosphere the dew points of which lie within the range from +15° C. to −50° C., for example −15° C. to −50° C. In this way, a decarburation of >60% can be achieved at an annealing temperature of 870° C., a throughput speed of 70 m/min and a dew point of 0° C. In contrast, an annealing temperature of 830° C., a throughput speed of 90 m/min and a dew point of the annealing atmosphere of −50° C. delivers a decarburation of approx. 30%.

If the slab consists of a composition typical of an IF steel, then at annealing temperatures of 650-870° C. the dew point of the annealing atmosphere can typically be selected at −10° C. and −50° C. In IF steel, the carbon is bound in the form of precipitates. Consequently, IF steel contains no free carbon, so that no decarburation can take place. The dew point of the annealing atmosphere can therefore be freely selected.

In order to improve the dimensional tolerance and optimise the surface quality, a flat steel product produced according to the invention is subjected, in an essentially known manner, to a skin-pass rolling in which it is typically finished with skin pass levels of at least 0.3%, in particular at least 0.5%, and max. 2.0%. If a steel with a composition typical of a bake-hardening steel is processed, then the skin-pass rolling can be carried out with higher skin pass levels, for example with skin pass levels of more than 0.75%, in particular more than 1%. If, on the other hand, steels with a composition typical of soft IF steels are processed, the skin pass level can be set to, typically, 0.5-1%, in particular up to 0.7%.

In order to reliably achieve the surface quality according to the invention through the skin-pass process according to the invention with a skin pass level of at least 0.5%, a work roll with a roughness, created through Electrical Discharge Texturing ("EDT"), characterised by Ra values of less than 2.7 μm and a peak count of more than 70 1/cm can be used.

In the case of zinc-based or zinc-magnesium-based hot-dip coatings or hot-dip coatings intended for a galvannealing treatment, the coating can be applied following the cold-rolling process and before the skin-pass process. In the case of electrolytically coated flat steel products, the coating can take place after the skin-pass process, wherein the skin-passing is in turn carried out following an annealing treatment. The annealing treatment can be carried out in a bell furnace or as continuous annealing. A flat steel product according to the invention provided with a correspondingly applied coating typically has a $Wsa_{mod}$ value of less than 0.30 μm, in particular less than 0.25 μm.

According to the invention, the aim is to keep the respective Wsa value "Wsa1-5" or "Wsa_mod" as low as possible. In any case, the respective Wsa(1-5) of a flat steel product produced according to the invention and with corresponding properties has in each case been less than 0.35 μm, so the specifications applied in practice for flat steel products intended for the manufacture of external car bodywork components are reliably fulfilled. This stipulation applies in particular to the Wsa(1-5) value, determined in the manner explained above on a 5%-deformed Marciniak cup. The lower the Wsa(1-5) value of the flat steel product according to the invention, the lower the probability that a waviness exceeding the permissible degree occurs in the components manufactured from the flat steel product according to the invention through forming. Wsa1-5 values which lie as close as possible to 0 μm are therefore to be regarded as optimal. The numerical values for the Wsa(1-5) value which are permissible according to the invention therefore extend over the range 0 μm-<0.35 μm and, for the value $Wsa_{mod}$, over the range 0 μm-<0.3 μm. As always when stating range limits, it is obvious to the person skilled in the art that for example the stipulation "0 μm" for the lower limit of the range specified according to the invention for the respective Wsa value is to be understood in the technical sense, that is to say it also includes tolerance-related deviations within the scope of the accuracy with which the relevant limit value is stated.

Typically, in practice the lower limit for the values determined for the respective Wsa value is around 0.2 μm, in particular 0.22 μm.

In order to prove the effect of the invention, for the tests 1-8, 10-25 and 27-30, melts with the compositions stated in Table 2 were melted and cast into slabs.

In Table 2, steel type "A" refers to a composition for a soft IF steel falling under the steel alloy stated in Table 1, steel type "B" refers to a composition falling under the ULC-BH steel alloy stated in Table 1 and steel type "C" refers to a composition falling under the ELC steel alloy stated in Table 1.

The slabs were heated in a furnace, in each case over the total residence time GLZ stated in Table 3, to the slab drawing temperature Bzt also stated in Table 3. Subsequently, they underwent a conventional hot-rolling programme in order to hot-roll them in each case into a hot-rolled strip. The deformation ΔdF achieved over the last roll pass of the hot-rolling, i.e. in the last roll stand of the hot-roll finishing train, is also stated in Table 3.

The hot strip "WB" thus obtained in each case was then cooled, again in an essentially conventional manner, to a coiling temperature HT typical for steels of the type in question, stated in each case in Table 3, wherein cooling commenced either within 0-4 seconds (cooling strategy "V") or within more than 4 seconds up to 15 seconds (cooling strategy "H") following the end of the hot-rolling. The respective cooling strategy is also shown in Table 3.

Then, the hot-rolled strips thus obtained were cold-rolled continuously into cold-rolled strips KB. The cold-roll level amounted to 70-90%. The thickness of the obtained cold strip was 0.5-1.1 mm.

Following the cold-rolling, the obtained cold strips were hot-dipped in a hot-dip galvanising line. For this purpose, the strips were first cleaned in order to remove dirt, fat, scale and emulsion residues from their surface. The cold strips were then recrystallisation annealed in a continuous furnace and then coated in a zinc bath with 0.2% by weight Al, traces of Fe and Pb, the remainder Zn and unavoidable impurities. The coating thickness was adjusted by means of a conventional air knife system to values between 1 to 15 μm.

The control and characteristic values significantly influencing the waviness following a 5% deformation: hot strip grain size "WB grain size", cold strip texture {111}<110>"KB texture {111}<110>", average size of the precipitates in the cold strip "Average size of the precipitates in the KB [nm]", average Δr value of the cold strip "Average Δr KB", Wsa(1-5) value of the undeformed flat steel product "Wsa 0%"; Wsa(1-5-5%) value of the flat steel product deformed with a 5% deformation into a Marciniak cup "Wsa 5%", the difference "ΔWsa" between the Wsa-0% and the Wsa-5%, the Wsa value of the coating "$Wsa_{mod}$", the nanohardness of the subsurface region H_bulk "Nanohardness H_bulk"; the "Nanoindentation ΔH", as well as the softening occurring after 2000 s at 650° C., determined through an HTC measurement "HTC measurement of softening after 2000 s at 650° C.", determined in each case on the cold-rolled and coated strips KB, are stated in Table 4. The positions in the tables for which no values were determined in evaluating the test in question are marked with "\".

TABLE 1

|  | Soft IF | ULC-BH | ELC |
|---|---|---|---|
| C | 0.0003-0.02 | 0.0004-0.010 | 0.009-0.05 |
| Si | 0.0005-0.20 | 0.0005-0.20 | 0.0001-0.12 |
| Mn | 0.01-0.35 | 0.05-1.5 | 0.05-0.5 |
| P | 0.001-0.025 | 0.001-0.10 | 0.001-0.04 |
| S | 0.005-0.03 | 0.0005-0.03 | 0.0005-0.03 |
| Al | 0.001-0.10 | 0.005-0.12 | 0.001-0.1 |
| N | 0.0001-0.01 | 0.0001-0.01 | 0.0001-0.01 |
| Ti | 0.01-0.15 | 0.0001-0.015 | max. 0.015 |
| Nb | max. 0.05 | 0.0001-0.03 | max. 0.015 |
| B | max. 0.0015 | max. 0.0015 | max. 0.005 |
| Cu | max. 0.15 | max. 0.15 | max. 0.15 |
| Cr | max. 0.15 | max. 0.15 | max. 0.15 |
| Ni | max. 0.15 | max. 0.15 | max. 0.15 |
| Mo | max. 0.10 | max. 0.10 | max. 0.1 |
| Sn | max. 0.05 | max. 0.05 | max. 0.05 |

Figures in % by weight, the remainder Fe and unavoidable impurities

TABLE 3

| Test | Melt | Total residence time [min] | Slab drawing temp. [° C.] | Cooling strategy | HT [° C.] | ΔdF [%] | According to the invention? |
|---|---|---|---|---|---|---|---|
| 1 | 1 | 269 | 1254 | H | 755 | 14.27 | No |
| 2 | 2 | 495 | 1296 | H | 745 | 12.60 | No |
| 3 | 3 | 353 | 1296 | H | 730 | 11.31 | No |
| 4 | 4 | 259 | 1285 | H | 740 | 13.01 | No |
| 5 | 5 | 348 | 1278 | H | 735 | 11.15 | No |
| 6 | 3 | 310 | 1298 | H | 745 | 11.60 | No |
| 7 | 6 | 368 | 1306 | H | 750 | 11.94 | No |
| 8 | 7 | 203 | 1267 | H | 630 | 13.70 | Yes |
| 10 | 9 | 386 | 1262 | H | 625 | 13.98 | Yes |
| 11 | 11 | 261 | 1299 | V | 730 | 15.40 | No |
| 12 | 12 | 258 | 1312 | V | 725 | 16.01 | No |
| 13 | 13 | 265 | 1261 | V | 765 | 14.21 | No |
| 14 | 14 | 459 | 1301 | V | 775 | 15.19 | No |
| 15 | 15 | 509 | 1272 | V | 772 | 16.01 | No |
| 16 | 16 | 248 | 1243 | V | 775 | 15.18 | No |
| 17 | 17 | 130 | 1206 | V | 663 | 9.14 | Yes |
| 18 | 18 | 135 | 1220 | V | 688 | 8.98 | Yes |
| 19 | 19 | 187 | 1269 | V | 670 | 9.09 | Yes |
| 20 | 20 | 139 | 1223 | V | 754 | 10.21 | Yes |
| 21 | 21 | 186 | 1219 | V | 752 | 9.76 | Yes |
| 22 | 22 | 198 | 1255 | V | 754 | 10.53 | Yes |
| 23 | 22 | 177 | 1261 | V | 727 | 10.47 | Yes |
| 24 | 23 | 288 | 1257 | V | 742 | 8.37 | Yes |
| 25 | 24 | 184 | 1255 | V | 724 | 9.49 | Yes |
| 27 | 28 | 230 | 1210 | V | 726 | 11.73 | No |
| 28 | 29 | 198 | 1234 | V | 770 | 11.97 | No |
| 29 | 30 | 189 | 1224 | V | 776 | 14.87 | No |
| 30 | 31 | 206 | 1193 | V | 767 | 15.53 | No |

TABLE 2

| Test | Melt | Steel type | C | Si | Mn | P | S | Al | N | Nb | Ti |
|---|---|---|---|---|---|---|---|---|---|---|---|
| 1 | 1 | A | 0.0033 | 0.007 | 0.15 | 0.012 | 0.006 | 0.047 | 0.0024 | 0.002 | 0.076 |
| 2 | 2 | A | 0.0023 | 0.005 | 0.13 | 0.009 | 0.006 | 0.028 | 0.0024 | 0.001 | 0.074 |
| 3 | 3 | A | 0.002 | 0.006 | 0.12 | 0.008 | 0.007 | 0.023 | 0.0027 | 0.002 | 0.076 |
| 4 | 4 | A | 0.0022 | 0.005 | 0.12 | 0.008 | 0.007 | 0.023 | 0.003 | 0.002 | 0.075 |
| 5 | 5 | A | 0.0018 | 0.006 | 0.12 | 0.008 | 0.007 | 0.023 | 0.0026 | 0.002 | 0.075 |
| 6 | 3 | A | 0.0021 | 0.005 | 0.13 | 0.009 | 0.007 | 0.025 | 0.0031 | 0.002 | 0.076 |
| 7 | 6 | A | 0.0024 | 0.006 | 0.14 | 0.012 | 0.008 | 0.028 | 0.002 | 0.002 | 0.07 |
| 8 | 7 | A | 0.0024 | 0.005 | 0.15 | 0.008 | 0.01 | 0.033 | 0.0027 | 0.002 | 0.077 |
| 10 | 9 | A | 0.0025 | 0.005 | 0.16 | 0.009 | 0.008 | 0.029 | 0.0023 | 0.002 | 0.072 |
| 11 | 11 | B | 0.0018 | 0.005 | 0.28 | 0.02 | 0.008 | 0.05 | 0.0015 | 0.0015 | 0.0005 |
| 12 | 12 | B | 0.0019 | 0.005 | 0.28 | 0.02 | 0.009 | 0.05 | 0.0014 | 0.0018 | 0.0006 |
| 13 | 13 | C | 0.0203 | 0.005 | 0.21 | 0.01 | 0.006 | 0.046 | 0.0016 | 0 | 0.0003 |
| 14 | 14 | C | 0.02 | 0.005 | 0.17 | 0.009 | 0.006 | 0.047 | 0.0017 | 0 | 0.0003 |
| 15 | 15 | C | 0.0188 | 0.005 | 0.19 | 0.008 | 0.006 | 0.043 | 0.0015 | 0 | 0.0005 |
| 16 | 16 | C | 0.0204 | 0.005 | 0.2 | 0.008 | 0.004 | 0.042 | 0.0018 | 0 | 0.0006 |
| 17 | 17 | A | 0.0018 | 0.005 | 0.15 | 0.01 | 0.009 | 0.027 | 0.0024 | 0.002 | 0.079 |
| 18 | 18 | A | 0.002 | 0.004 | 0.16 | 0.011 | 0.008 | 0.04 | 0.0024 | 0.002 | 0.078 |
| 19 | 19 | A | 0.0021 | 0.005 | 0.15 | 0.007 | 0.009 | 0.03 | 0.0025 | 0.002 | 0.074 |
| 20 | 20 | A | 0.0023 | 0.004 | 0.13 | 0.006 | 0.005 | 0.04 | 0.0025 | 0.002 | 0.077 |
| 21 | 21 | A | 0.0022 | 0.005 | 0.13 | 0.008 | 0.007 | 0.023 | 0.0026 | 0.002 | 0.075 |
| 22 | 22 | A | 0.0028 | 0.018 | 0.12 | 0.009 | 0.01 | 0.025 | 0.0023 | 0.001 | 0.073 |
| 23 | 22 | A | 0.0021 | 0.081 | 0.11 | 0.008 | 0.007 | 0.019 | 0.0021 | 0.002 | 0.056 |
| 24 | 23 | A | 0.0025 | 0.081 | 0.11 | 0.008 | 0.007 | 0.019 | 0.0021 | 0.002 | 0.056 |
| 25 | 24 | A | 0.0025 | 0.007 | 0.14 | 0.008 | 0.007 | 0.035 | 0.0024 | 0.002 | 0.079 |
| 27 | 28 | B | 0.0014 | 0.004 | 0.26 | 0.02 | 0.006 | 0.056 | 0.0027 | 0.0012 | 0.0003 |
| 28 | 29 | C | 0.0223 | 0.006 | 0.18 | 0.007 | 0.007 | 0.048 | 0.0022 | 0 | 0.0004 |
| 29 | 30 | C | 0.0208 | 0.005 | 0.2 | 0.008 | 0.004 | 0.044 | 0.0018 | 0 | 0.0006 |
| 30 | 31 | C | 0.0199 | 0.004 | 0.19 | 0.009 | 0.007 | 0.058 | 0.0018 | 0 | 0.0004 |

FIGURES in % by weight, the remainder iron and unavoidable impurities incl. contents of Cu, Cr, Ni, Mo, Sn

TABLE 4

| Test | Melt | WB grain size [μm] | KB texture {111}<110> [Peak] | Average size of precipitations in KB [nm] | Δr KB | Wsa 0% [μm] | Wsa 5% [μm] | ΔWsa [μm] | Wsa$_{mod}$ | Nano-hardness H_Bulk [GPa] | Nano-indentation ΔH (H_25 μm − H_Bulk) [GPa] | HTC measurement of softening after 2000 s at 650° C. [%] | Invention |
|---|---|---|---|---|---|---|---|---|---|---|---|---|---|
| 1 | 1 | 18.5 | 10.6 | approx. 5-30 | 0.54 | 0.20 | 0.29 | 0.09 | 0.32 | \ | \ | 62.00 | No |
| 2 | 2 | 23.8 | 10.6 | \ | 0.62 | 0.19 | 0.34 | 0.14 | 0.34 | 1.5 | 0.41 | 66.00 | No |
| 3 | 3 | 28.9 | 11.7 | \ | 0.60 | 0.31 | 0.38 | 0.07 | 0.31 | 1.6 | 0.63 | 65.00 | No |
| 4 | 4 | 20.8 | 11.9 | approx. 5-30 | 0.75 | 0.31 | 0.49 | 0.17 | 0.37 | 1.5 | 0.42 | 70.00 | No |
| 5 | 5 | 28.0 | \ | approx. 5-30 | 0.71 | 0.32 | 0.44 | 0.12 | 0.33 | 1.6 | 0.72 | 64.00 | No |
| 6 | 3 | 24.9 | \ | approx. 5-30 | 0.75 | 0.31 | 0.40 | 0.09 | 0.30 | 1.6 | 0.44 | 64.00 | No |
| 7 | 6 | 19.0 | \ | \ | 0.64 | 0.29 | 0.36 | 0.07 | 0.32 | 1.5 | 0.72 | 60.00 | No |
| 8 | 7 | 14.3 | 10.5 | approx.70-90 | 0.49 | 0.35 | 0.32 | −0.03 | 0.24 | 1.6 | 0.05 | 86.00 | Yes |
| 10 | 9 | 15.3 | \ | approx. 60 | 0.40 | 0.33 | 0.32 | −0.01 | 0.26 | 1.6 | −0.2 | 93.00 | Yes |
| 11 | 11 | 18.5 | \ | \ | 0.93 | 0.32 | 0.42 | 0.11 | 0.31 | \ | \ | \ | No |
| 12 | 12 | 18.3 | \ | \ | 0.93 | 0.32 | 0.53 | 0.21 | 0.37 | \ | \ | \ | No |
| 13 | 13 | 20.3 | \ | \ | 0.55 | 0.24 | 0.32 | 0.08 | 0.32 | \ | \ | \ | No |
| 14 | 14 | 21.6 | \ | \ | 0.67 | 0.24 | 0.32 | 0.08 | 0.31 | \ | \ | \ | No |
| 15 | 15 | 18.8 | \ | \ | 0.73 | 0.24 | 0.30 | 0.06 | 0.30 | \ | \ | \ | No |
| 16 | 16 | 20.7 | \ | \ | 0.67 | 0.26 | 0.33 | 0.07 | 0.30 | 2.2 | 1.00 | \ | No |
| 17 | 17 | 12.4 | 8.5 | approx. 60 | 0.42 | 0.21 | 0.22 | 0.01 | 0.26 | 1.6 | −0.07 | 94.00 | Yes |
| 18 | 18 | 11.6 | \ | \ | 0.30 | 0.29 | 0.31 | 0.02 | 0.28 | 1.6 | −0.06 | 93.00 | Yes |
| 19 | 19 | 12.0 | 10.3 | approx. 80-100 | 0.29 | 0.30 | 0.29 | −0.01 | 0.23 | 1.5 | 0.1 | \ | Yes |
| 20 | 20 | 12.6 | \ | approx. 60 | 0.42 | 0.33 | 0.30 | −0.03 | 0.25 | \ | \ | \ | Yes |
| 21 | 21 | 14.4 | 9.9 | approx. 80-100 | 0.44 | 0.33 | 0.32 | −0.01 | 0.24 | 1.5 | −0.09 | 91.00 | Yes |
| 22 | 22 | 13.4 | \ | approx. 80-100 | 0.21 | 0.34 | 0.28 | −0.05 | 0.25 | \ | \ | \ | Yes |
| 23 | 22 | 22.8 | 10.4 | \ | 0.34 | 0.32 | 0.29 | −0.03 | 0.24 | \ | \ | \ | Yes |
| 24 | 23 | 18.0 | 10.1 | approx. 80-100 | 0.21 | 0.33 | 0.34 | 0.02 | 0.26 | 1.6 | −0.17 | 92.00 | Yes |
| 25 | 24 | 12.2 | 9.1 | approx. 80-100 | 0.26 | 0.26 | 0.26 | 0.00 | 0.25 | 1.6 | −0.18 | 93.00 | Yes |
| 27 | 28 | 22.9 | \ | \ | 0.84 | 0.29 | 0.40 | 0.12 | 0.35 | \ | \ | \ | No |
| 28 | 29 | 18.1 | \ | \ | 0.58 | 0.22 | 0.32 | 0.10 | 0.33 | 2.1 | 0.80 | \ | No |
| 29 | 30 | 23.2 | \ | \ | 0.65 | 0.24 | 0.39 | 0.15 | 0.35 | 2.0 | 0.70 | \ | No |
| 30 | 31 | 22.2 | \ | \ | 0.66 | 0.22 | 0.30 | 0.08 | 0.31 | 2.2 | 0.60 | \ | No |

"KB": cold-rolled strip;
"WB": hot-rolled strip,
"\" = not determined.

The invention claimed is:

1. A method for manufacturing flat steel products which, following a five percent biaxial deformation, exhibit, on at least one of their surfaces, a Wsa(1-5) value of less than 0.35 μm, a planar anisotropy Δr of −0.5 to +0.5 and, in a region which extends from the surface of the respective flat steel product to a depth of less than 200 μm, a nanohardness H of more than 0.1 GPa and less than 3.0 GPa, comprising the following working steps:
   a) providing a slab which is made of a steel which comprises (in % by weight)
   C: 0.0003-0.050%
   Si: 0.0001-0.20%
   Mn: 0.01-1.5%
   P: 0.001-0.10%
   S: 0.0005-0.030%
   Al: 0.001-0.12%
   N: 0.0001-0.01%
   as well as, optionally, one or more elements from the group "Ti, Nb, B, Cu, Cr, Ni, Mo, Sn", provided that
   Ti: 0.0001-0.15%
   Nb: 0.0001-0.05%
   B: ≤0.005%
   Cu: ≤0.15%
   Cr: ≤0.15%
   Ni: ≤0.15%
   Mo: ≤0.10%
   Sn: ≤0.05%
   the remainder being Fe and unavoidable impurities;
   b) heating the slab in a furnace to a slab drawing temperature Bzt of 1200-1270° C. at which the slab is drawn out of the furnace;
   c) hot-rolling the slab into a 3-5 mm thick hot-rolled flat steel product, wherein the hot-rolling comprises a rough rolling with a thickness reduction of 80-90% and a finishing rolling with a thickness reduction of 85-95%, wherein the overall degree of deformation achieved during the hot-rolling is 95-99.5%, wherein a thickness reduction ΔdF of 1-25% is achieved in the last roll pass and wherein the final hot-rolling temperature is 850-950° C.;
   d) cooling the obtained hot-rolled flat steel product to a coiling temperature of 620-780° C., wherein the cooling rate is 4-30 K/s;
   e) coiling the hot-rolled flat steel product into a coil;
   f) pickling the hot rolled flat steel product to remove scale;
   g) cold-rolling the pickled hot-rolled flat steel product into a cold-rolled flat steel product, wherein the total degree of deformation achieved through the cold-rolling is 70-90%; and
   h) recrystallisation annealing the cold-rolled flat steel product at an annealing temperature of 650-900° C.

wherein the slab drawing temperature Bzt, a total residence time GLZ which the slab spends in the furnace between being pushed in and drawn out, the thickness reduction in the last hot roll pass ΔdF and the coiling temperature HT satisfy the following condition:

−0.529653*Q+0.944372*HT_t+0.711559*ΔdF_t<−0.1889459 where Q=((Bzt/GLZ) −5.55281° C./min)/(1.777359° C./min)

Bzt: slab drawing temperature in ° C.
GLZ: total residence time in min
HT _t=(HT−728.13030° C.)/42.300114° C.
HT: coiling temperature in ° C.
ΔdF _t=(ΔdF −12.43384%)/2.306328% ΔdF: thickness reduction in the last hot roll pass in %.

2. The method according to claim 1, wherein the slab drawing temperature Bzt is less than 1250° C.

3. The method according to claim 1, wherein, during the course of the hot-rolling, the slab first undergoes a rough hot-rolling and then a finishing hot-rolling.

4. The method according to claim 1, wherein the recrystallisation annealing takes place in a throughfeed process at an annealing temperature of 650-870° C. at a throughput speed of 70-180 m/min and a dew point of the annealing atmosphere of +15° C. to −50° C.

5. The method according to claim 1, further comprising coating the annealed cold-rolled flat steel product with a corrosion protection coating.

6. The method according to claim 5, wherein the corrosion protection coating is a Zn-based coating.

7. The method according to claim 1, wherein the recrystallisation annealing is carried out under a decarburising annealing atmosphere.

8. The method according to claim 1, further comprising skin-pass rolling of the cold-rolled flat steel product after recrystallisation annealing with a degree of deformation of 0.3-2.0%.

9. The method according to claim 8, wherein the degree of deformation achieved during skin-pass rolling is 0.5-2%.

10. A cold-rolled flat steel product which is made of a steel which comprises (in % by weight)
C: 0.0003-0.050%
Si: 0.0001-0.20%
Mn: 0.01-1.5%
P: 0.001-0.10%
S: 0.0005-0.030%
Al: 0.001-0.12%
N: 0.0001-0.01%
as well as, optionally, one or more elements from the group "Ti, Nb, B, Cu, Cr, Ni, Mo, Sn", provided that
Ti: 0.0001-0.15%
Nb: 0.0001-0.05%
B: ≤0.005%
Cu: ≤0.15%
Cr: ≤0.15%
Ni: ≤0.15%
Mo: ≤0.10%
Sn: ≤0.05%
the remainder being Fe and unavoidable impurities
and
which possesses, on at least one surface, after a five percent biaxial deformation, a Wsa(1-5) value of less than 0.35 μm, a planar anisotropy Δr of −0.5 to +0.5 and, in a region which extends from the at least one surface of the respective flat steel product to a depth of less than 200 μm, a nanohardness H of more than 0.1 GPa and less than 3.0 GPa.

11. The col-rolled flat steel product according to claim 10, wherein the Wsa(1-5) value determined on the at least one surface following the five percent biaxial deformation is higher by a maximum of 0.05 μm than the Wsa(1-5) value of the at least one surface prior to deformation.

12. The cold-rolled flat steel product according to claim 10, wherein the cold-rolled flat steel product is coated with a corrosion protection coating and the $Wsa_{mod}d$ value of the corrosion protection coating is less than 0.30 μm.

13. The cold-rolled flat steel product according to claim 10, wherein a peak of a texture of the cold-rolled flat steel product with an orientation of gamma fibres of {111}<110> is 8.5-10.5.

14. The cold-rolled flat steel product according to claim 10, wherein an average size of precipitates in the cold-rolled flat steel product is 60-150 nm.

15. The cold-rolled flat steel product according to claim 10, wherein at 2000 s and 650° C., HTC softening of the cold-rolled flat steel product is 86-100%.

16. The cold-rolled flat steel product according to claim 10, wherein a difference ΔH in a nanohardness of a region starting out from the at least one surface of the cold-rolled flat steel product to a depth of 25 μm and the nanohardness of a deeper region more than 25 μm distant from the at least one surface of the cold-rolled flat steel product is -0.3 MPa to 0.4 MPa.

* * * * *

UNITED STATES PATENT AND TRADEMARK OFFICE
CERTIFICATE OF CORRECTION

| | |
|---|---|
| PATENT NO. | : 11,453,923 B2 |
| APPLICATION NO. | : 16/334503 |
| DATED | : September 27, 2022 |
| INVENTOR(S) | : Frank Friedel et al. |

It is certified that error appears in the above-identified patent and that said Letters Patent is hereby corrected as shown below:

On the Title Page

Column 2, Abstract, Line 8, Delete "AI," and insert -- Al, --

In the Claims

Column 21, Line 46, Claim 1, delete "the" and insert -- a --

Column 22, Line 67, Claim 1, after "C." insert -- ; --

Column 24, Line 19, Claim 11, delete "col" and insert -- cold --

Column 24, Line 27, Claim 12, before "value" delete "d"

Signed and Sealed this
Twenty-second Day of November, 2022

*Katherine Kelly Vidal*

Katherine Kelly Vidal
*Director of the United States Patent and Trademark Office*